United States Patent
Bankuty et al.

[11] Patent Number: 5,851,042
[45] Date of Patent: Dec. 22, 1998

[54] COLLET FOR GRIPPING CONTAINER CAPS

[76] Inventors: Geza E. Bankuty, 6204 29th St. E., Brandenton, Fla.; Nicholas J. Perazzo, 4216 74th Ter. E., Sarasota, Fla. 34243

[21] Appl. No.: 780,273

[22] Filed: Jan. 9, 1997

[51] Int. Cl.[6] .................................................. B25J 15/10
[52] U.S. Cl. ............................. 294/106; 279/37; 294/88; 294/116
[58] Field of Search .................................. 294/88, 94, 95, 294/99.1, 100, 106, 115, 116; 81/128; 279/4.09, 37, 43, 43.7, 46.7, 50

[56] References Cited

U.S. PATENT DOCUMENTS

| | | | |
|---|---|---|---|
| 2,555,836 | 6/1951 | Werich | 279/37 X |
| 2,863,579 | 12/1958 | Meyer . | |
| 2,899,232 | 8/1959 | Walter, Jr. | 294/65 |
| 3,108,835 | 10/1963 | Rowekamp | 294/88 |
| 3,863,753 | 2/1975 | Shank, Jr. | 198/179 |
| 3,881,763 | 5/1975 | Benson | 294/116 |
| 4,169,621 | 10/1979 | McGill | 294/116 |
| 4,395,069 | 7/1983 | Lebret | 294/87.22 |
| 4,768,428 | 9/1988 | Silvestrini et al. | 294/99.1 |

*Primary Examiner*—Johnny D. Cherry
*Attorney, Agent, or Firm*—Pettis & Van Royen P.A.

[57] ABSTRACT

A collet to be used in conjunction with a container capping device used primarily in the packaging industry, more particularly for gripping threaded container caps in preparation for the rotation of the caps onto threaded containers. The structure comprises separately pivoting segments for engaging the container cap without significant flexure of the segments.

7 Claims, 4 Drawing Sheets

COLLET FOR GRIPPING CONTAINER CAPS

BACKGROUND OF THE INVENTION

1. Field of the Invention

The present invention relates to collets designed for gripping container caps in preparation for rotation of the collets by related equipment.

2. Description of the Prior Art

The packaging industry utilizes many different devices for movement of articles along a predetermined path during the packaging process. Many such devices are designed to grip bottles adjacent to the open end, whether capped or not, for movement of those bottles from one operation point to another along the packaging line. A number of these devices are disclosed by U.S. patents, in particular: U.S. Pat. No. 2,899,232, issued to A. J. Walter, Jr.; U.S. Pat. No. 4,395,069, issued to Labrett; U.S. Pat. No. 4,169,621, issued to McGill; and U.S. Pat. No. 3,863,753 issued to Shank, Jr. Each of these patents disclose various devices designed to grip the bottle or container at a point below the lid. None of these devices are capable of gripping a container cap for rotation of that cap as they are designed to grip the container below an annular ring portion that extends outwardly from the body of the container rather than the container cap itself. The structure of these devices relates to applying lifting forces to the annular ring of the container rather than gripping the cap for application of rotational forces.

Collets currently in use are comprised of a plurality of fingers that are contiguously joined to one another, but are comprised of flexible material that is sufficiently thin to flex between an open position and a closed position. In the closed position the fingers grip the container cap. The constant flexing of the fingers through numerous operations causes frequent failure of the fingers at the flex point.

Not withstanding the existence of such prior art collets and bottle grippers, it remains clear that there is a need for a collet able to withstand the constant movement from the open position to the closed position without frequent failure of the collet itself.

SUMMARY OF THE INVENTION

The present invention relates to a collet for gripping the exterior surface of a generally cylindrical threaded cap, so that the cap may be threadably received by a threaded open end of a container. The collet does not require flexing of the gripping segments reducing the stress thereon and extending the life of the collet. The collet comprises a plug having a first end surface and a second end surface and at least one side extending therebetween and a plurality of segments, each of which have a first end, a second end, a first side and a second side. Each segment is mounted in series about the first side of the plug so that a portion of the first end of each segment engages the plug for movement of the second end of each segment between an open position and a closed position. The second end of each segment is sized and configured to engage a portion of the exterior surface of a threaded cap when the segment is in the closed position.

A means for biasing each segment from the closed position to the open position is received between the plurality of segments so that the means for biasing engages the first side of each segment proximal the first end of the segment. A band, forming a closed loop, engages the second side of each segment of the collet, generally normal to the longitudinal axis of the collet, so that the band holds each segment in engagement with the plug and the biasing means.

The application of a force to the second side of each segment proximal the second end of the segment compresses the biasing means so that the second end of each segment moves inwardly toward one another, moving the collet to the closed position. When a container cap has been inserted between the second ends of the segments and the collet is moved to the closed position, the second end of each segment engages a portion of the side of the container cap tightly gripping that cap for rotation. The cap is then placed adjacent to the threaded open end of a container so that the cap is threadably received by the container.

The invention accordingly comprises an article of manufacture possessing the features, properties and the relation of elements which will be exemplified in the article hereinafter described, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF PREFERRED EMBODIMENTS

Figure 4:
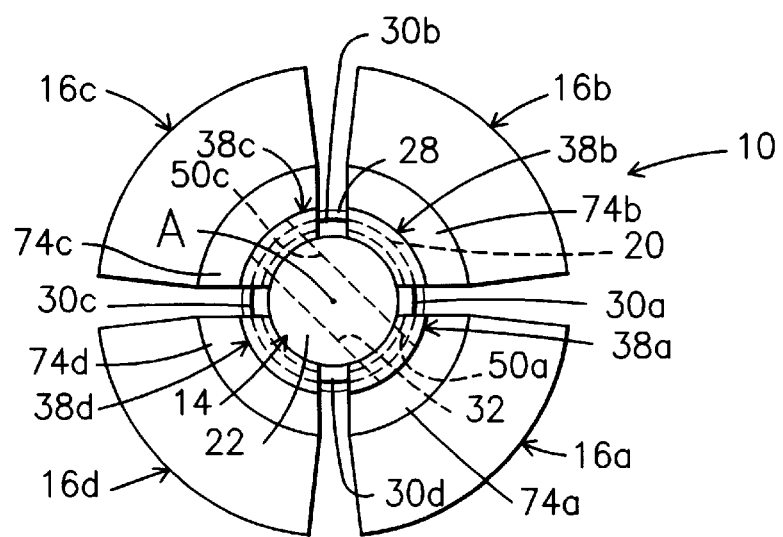
FIG. 4 is a top plan view of the invention of FIG. 1.
Figure 5:
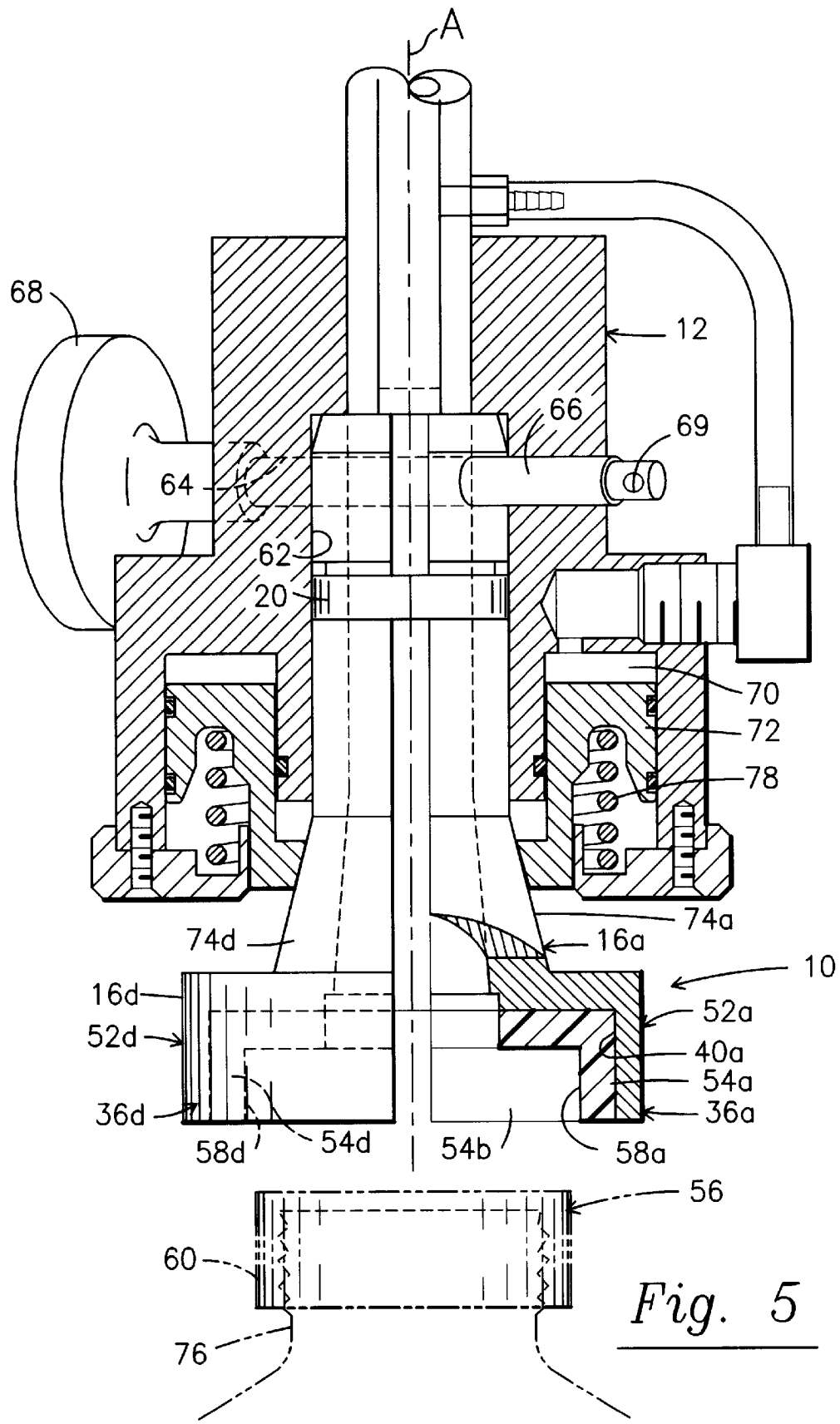
FIG. 5 is a partial cross sectional view of the invention of FIG. 1 illustrating the collet installed in a typical collet housing.

Preferred embodiments of the apparatus of the present invention will be described below in connection with the various drawings. The collet is generally indicated as 10 in the views of FIGS. 1–5 and a housing into which the collet 10 may be inserted is illustrated in FIG. 5 and is generally indicated as 12.

Figure 1:
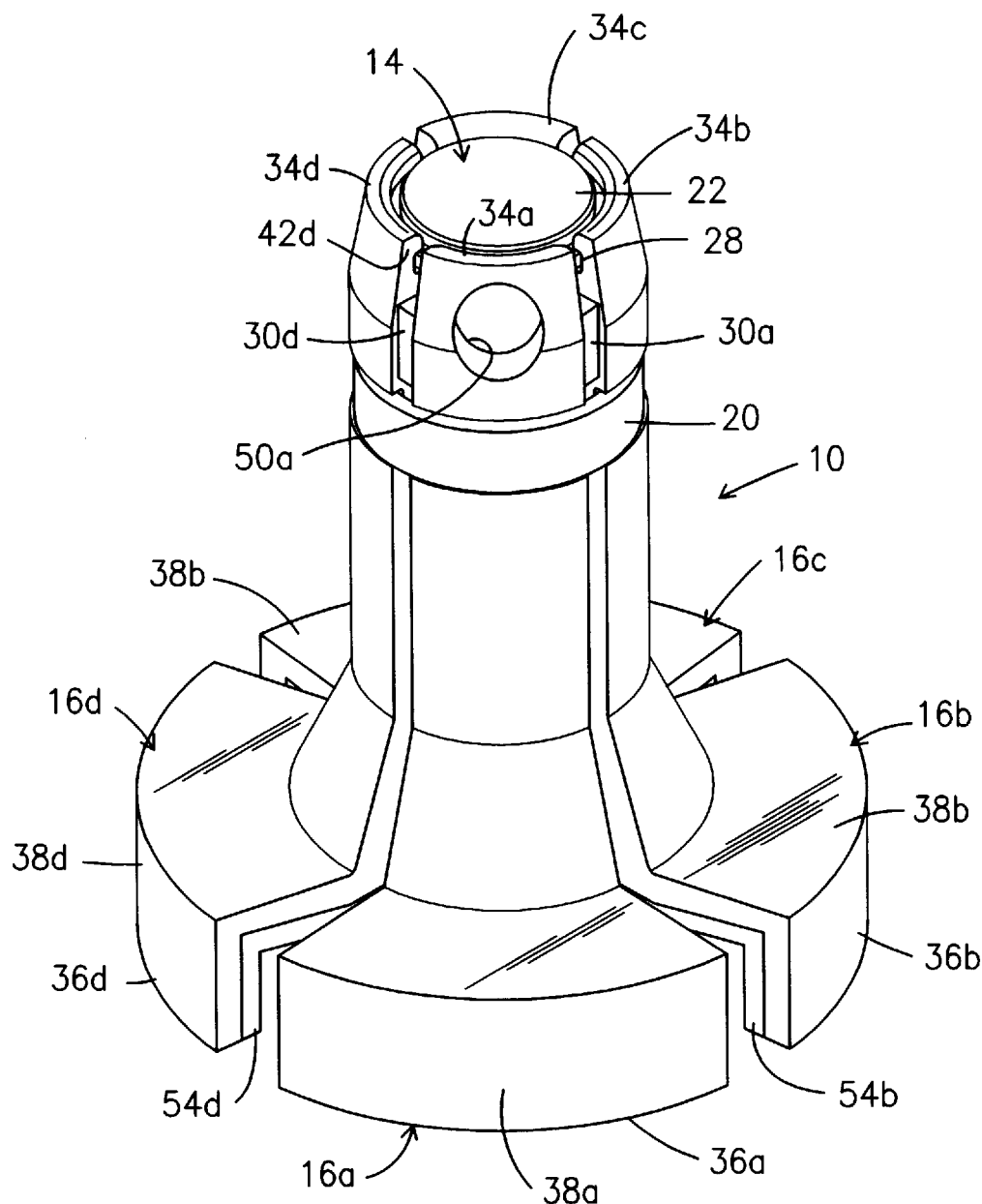
FIG. 1 is a perspective view of the present invention.
Figure 2:
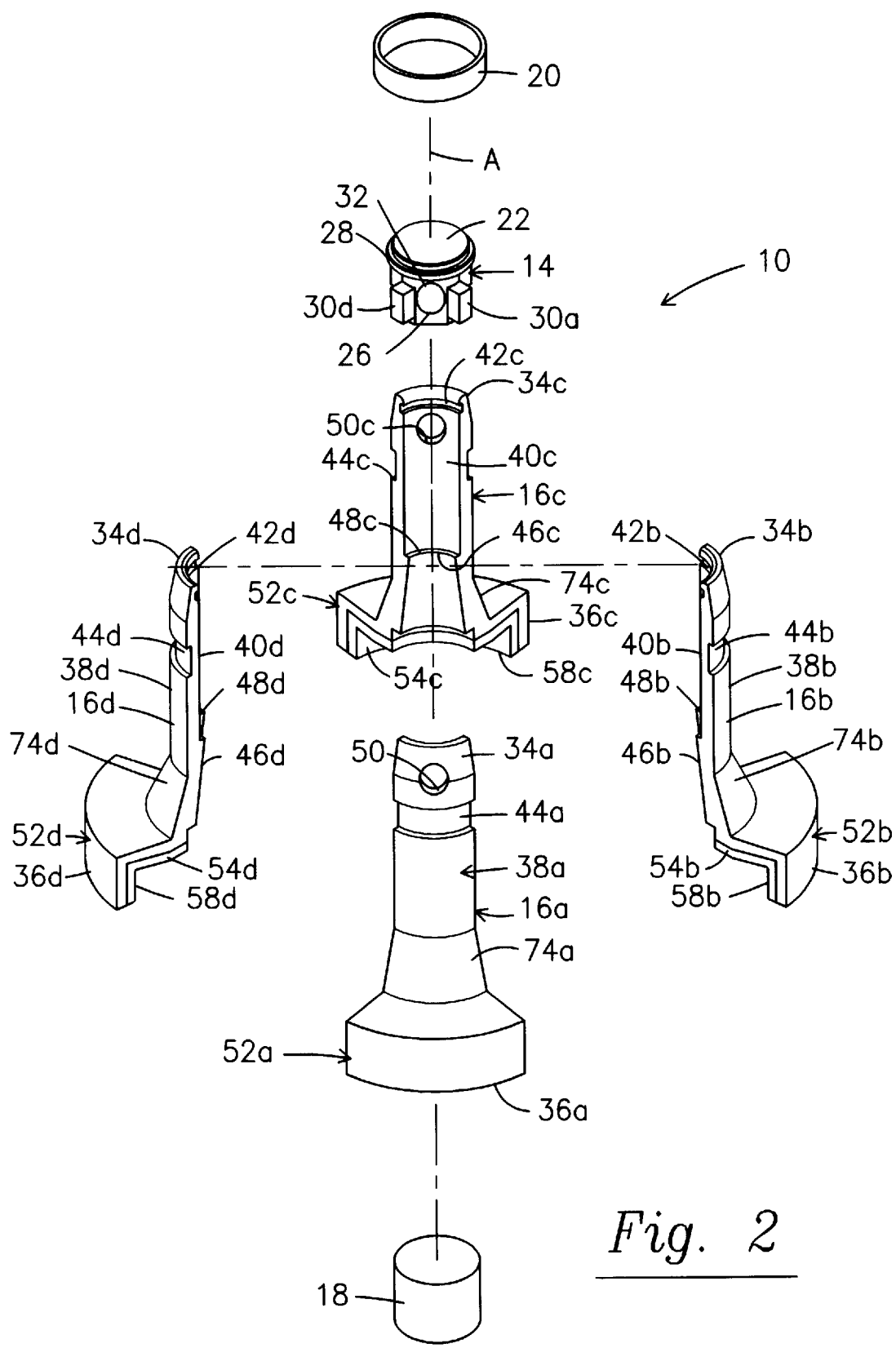
FIG. 2 is an exploded perspective view of the invention of FIG. 1.

As can be seen in FIG. 1 and more clearly in FIG. 2, the collet 10 is comprised of a plug, shown generally as 14, a plurality of segments, each shown generally as 16a–16d, a means for biasing the segments between an open and a closed position, conveniently body 18, and a band 20.

The plug 14 has a first end surface 22, a second end surface 24, and at least one side 26 extending therebetween. In a preferred embodiment as illustrated in FIGS. 1–4, the plug 14 is generally cylindrical with a ridge 28 formed on the side 26 so that a plane passing through the ridge 28 is generally normal to an axis A extending through the collet 10 as shown most clearly in FIG. 3. In other embodiments of the collet 10, the plug 14 may have a plurality of sides. The plug 14 further comprises a plurality of vanes 30a–30d that extend outwardly from the side 26 of the plug. In a preferred embodiment as illustrated in FIG. 2, the vanes 30a–30d are generally rectangular in shape with their longitudinally extending sides extending generally parallel to the axis A. As shown in FIG. 4, the vanes 30a–30d are evenly spaced about the side 26. The plug 14 has a bore 32 therethrough that passes through opposing portions of the side 26 and also, in this embodiment, passes through the axis A.

In a preferred embodiment illustrated in the FIGS. 1–5, the collet comprises four segments 16a–16d; however, any number of segments greater than two (2) may be used. Each of the segments 16a–16d has a first end 34a–34d, a second end 36a–36d, a first side 38a–38d and a second side 40a–40d, respectively. Each segment 16a–16d further comprises a groove 42a–42d, respectively, formed on the second side 40a–40d, respectively, of each segment proximal the first end 34a–34d of each segment 16a–16d. The grooves 42a–42d are sized and configured to receive the ridge 28 of the plug 14 therein, with the grooves 42a–42d being sufficiently large to permit pivotal movement of each of the segments 16a–16d about the ridge 28. Each segment 16a–16d also has a recess 44a–44d, respectively, formed in the first side 38a–38d thereof. Each recess 44a–44d is sized and configured to receive the band 20 therein. A shoulder 46a–46d is formed on the second side 40a–40d of each segment 16a–16d, respectively, so that each surface 48a–48d of each shoulder 46a–46d faces toward the first end 34a–34d of each segment 16a–16d.

Figure 3:
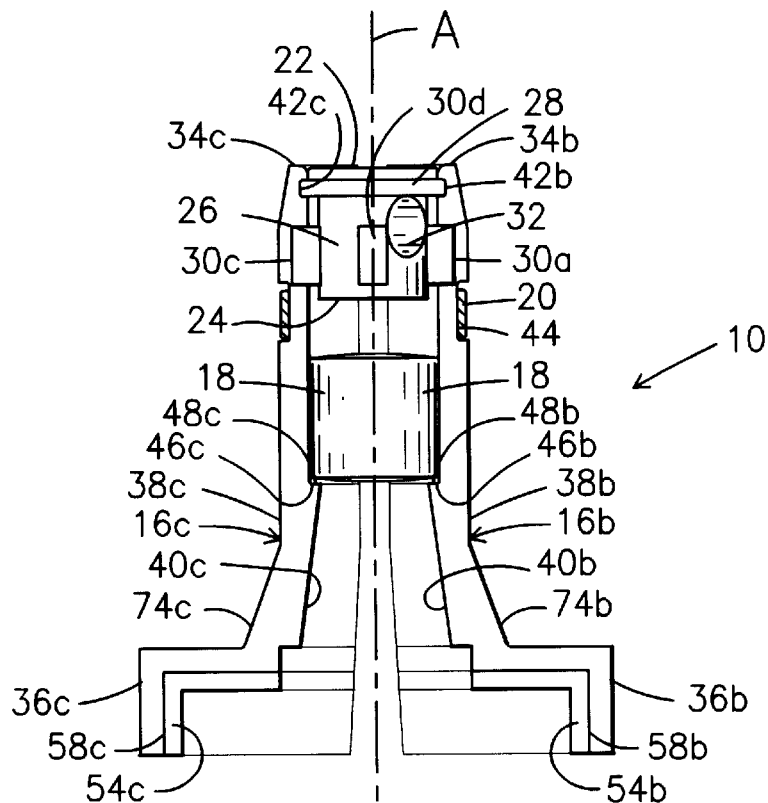
FIG. 3 is a side elevational view of a portion of the invention of FIG. 1.

FIG. 1 illustrates the collet in assembled form and FIG. 3 is a partial cross sectional view of the collet 10 that results in segments 16a and 16d being removed for illustrative purposes. Each of the segments 16a–16d is mounted in series on the plug 14 so that the groove 42a–42d of each segment engages the ridge 28 of the plug 14. As can be seen in FIG. 3, segment 16b has been generally longitudinally aligned with the axis A that passes through the plug 14 so that the groove 42b engages the ridge 28. In like fashion, segments 16c, 16d and 16a are also generally longitudinally aligned with axis A so that the grooves 42c, 42d and 42a pivotally engage the ridge 28. When there are four segments, 16a–16d, there are also four vanes 30a–30d formed on the plug 14. The vanes 30a–30d are equally spaced about the plug 14 and the width of each segment 16a–16d is sized so that each segment 16a–16d is received between adjacent vanes 30a–30d. Specifically, in FIG. 4 it can be seen that segment 16a lies between vanes 30a and 30d, segment 16b lies between vanes 30a and 30b, segment 16c lies between vanes 30b and 30c and segment 16d lies between vanes 30c and 30d. The second side 40a–40d of each segment is curved so that the portion of the segment 16a–16d proximal the first end 34a–34d of each segment 16a–16d lies adjacent to the cylindrical plug 14. Each segment 16a–16d may now each pivot between a closed position, defined as when the second ends 36a–36d move inwardly toward one another to grip a container cap, and an open position, defined as when the second ends 36a–36d move away from one another and are disengaged from the container cap.

The band 20 is slid over the small end of the collet 10 until it engages each of the recesses 44a–44d of each of the segments 16a–16d. The band 20 is comprised of stainless steel and fits sufficiently loosely to permit inward and outward movement by each of the segments 16a–16d.

In a preferred embodiment, the means for biasing the segments 16a–16d to the open position comprises an elastomer body 18 that seeks to return to its expanded state when compressed. The body 18 is inserted between the segments 16a–16d so that the body 18 engages the second side 40a–40d of the respective segments 16a–16d. The body 18 applies pressure against each of the segments 16a–16d forcing each segment 16a–16d outwardly to the open position for receipt of a container cap therebetween. The body 18 is preferably formed of 80 durometer urethane, but may be formed from any material that is suitable for the purpose. In addition, any biasing system known to those skilled in the art, for example those comprised of springs, or springs and levers, may be used in the alternative. The body 18 is maintained between the segments 16a–16d by a shoulder 46a–46d that is formed in each respective segment 16a–16d. The surface 48a–48d of each shoulder 46a–46d, is formed in its respective segment to generally face toward the first end 34a–34d, so that the body 18 engages the shoulder 46a–46d to prevent movement of the body 18 toward the second end 36a–36d of each segment 16a–16d. This can be seen clearly in FIG. 3 where the surface 48b of the shoulder 46b engages the body 18 and surface 48c of the shoulder 46c engages the body 18.

In FIG. 2 it can be seen that the segments 16a and 16c that generally oppose one another each have a hole 50 therethrough. As seen in FIG. 4, the holes 50 are aligned with the bore 32 in the plug 14 when the segments 16a and 16c are mounted on the plug 14.

In a preferred embodiment the second end 36 of each segment 16a–16d includes a cap gripping portion 52a–52d respectively having an interior radius greater than the radius of the cap to be installed on the container. In a preferred embodiment, the second side 40, proximal the second end 36, further comprises a liner 54 that is comprised of individual parts 54a–54d that are molded to a respective one of the cap gripping portions 52a–52d of each respective segment 16a–16d. The liner 54a–54d is comprised of an elastomer, preferably polyurethane, that is sized to tightly grip a cap when the collet 10 is in the closed position. Not only does this provide an improved gripping surface, it also permits the same collet 10 to be used for a number of different sized caps 56 by forming liners 54a–54d with different thicknesses. The interior side surface 58a–58d of each liner 54a–54d grips the exterior side surface 60 of the generally cylindrical threaded cap 56 when the collet is in the closed position.

The collet 10 is designed so that the first end 34a–34d of each segment 16a–16b is received within a cylindrical opening 62 of the housing 12. The holes 50a and 50c of the collet 10 are aligned with a bore 64 in the housing 12 so that a pin 66 may be inserted in the bore 64 of the housing 12 through the holes 50a and 50c in the segments 16a and 16c and thus through the bore 32 through the plug 14. The pin 66 has a handle 68 on one end for easy insertion and removal of the pin 66 for rapid removal and attachment of the collet 10. This permits a quick exchange of the collet 10 during production runs, when converting to a production run of containers having different sized caps. The end of the pin 66 opposite the handle 68 may be clipped or have a cotter pin therethrough(not shown) to hold the handle in place during operation of the collet 10.

In a preferred embodiment, plug 14 and the segments 16a–16d are made from tool steel. In other embodiments the collet 10 may be made from different quality steel or from plastics or other material that is suitable for the purpose.

Having thus set forth the preferred construction for the collet 10 of this invention, it is to be remembered that this is but a preferred embodiment. Attention is now invited to a description of the use of the collet 10. An appropriately sized collet 10 is selected, one with a liner 54a–54d that is sized to grip the cap 56 when the collet segments 16a–16d are moved to the closed position. If a liner 54a–54d is not in place on each of the segments of the selected collet 10, a liner 54a–54d will need to be formed about the cap 56 that is to be tightened. The liners 54a–54d are then attached to their respective cap gripping portions 52a–52d of each segment 16a–16d.

The collet 10 is assembled by grouping the segments 16a–16d together in proper sequence, particularly so that the segments 16a and 16c that have the holes 50a and 50c respectively therethrough are opposed to one another, and then sliding the band 20 over the first ends 34a–34d of the segments 16a–16d until the band 20 rests in the recesses 44a–44d of each respective segment 16a–16d. The first ends 34a–34d of each of the segments are spread as far as possible from one another and the plug 14 is inserted in the space between the segments so that each of the vanes 30a–30d separate a pair of adjacent segments 16. For example, as shown in FIG. 4, the vane 30a spaces apart segment 16a from segment 16b and the vane 30b spaces apart the segment 16b from the segment 16c and so forth in sequence. The plug 14 is inserted inwardly until the ridge 28 engages the groove 42a–42d of each of the respective segments 16a–16d. Of course, the plug 14 should be aligned so that the bore 32 therethrough is aligned with the hole 50a in segment 16a and hole 50c in segment 16c. The elastomer biasing means, conveniently body 18 is inserted between the second ends 36a–36d of the respective segments 16a–16d, and is forced upwardly until the body 18 has passed the shoulder 46a–46d. The body 18 will now engage the surface 48a–48d of each shoulder 46a–46d as the body 18 expands, preventing the body from falling out of the collet 10. The expansion of body 18 presses against the second side 40a–40d of each segment 16a–16d biasing the collet to the open position by spreading the second ends 36a–36d of the segments 16a–16d away from one another. The band 20 and the vanes 30a–30d hold the segments 16a–16d in relationship with one another against the expanding force of the body 18. The collet 10 is now ready to be received by a housing 12 as illustrated in FIG. 5.

The collet 10 is inserted in the housing 12 so that the holes 50a and 50c are aligned with the bore 64 through the housing 12. The pin 66 is then inserted through the bore 64 of housing 12, the holes 50a and 50c and the bore 32 through the plug 14. A cotter pin (not shown) may be passed through the hole 69 to keep the pin 66 in place. The type of housing 12 illustrated is operated by compressed air which enters an annular chamber 70 pushing a ring shaped piston 72 outwardly from the housing 12 so that the piston ring 72 engages the cammed surface 74a–74d that is formed on each respective segment 16a–16d. As seen in FIG. 5, the piston 72 is engaging the cammed surfaces 74a and 74c, moving the cap gripping portions 52a–52d of the segments 16a–16d to a closed position, that results in the interior side portions 58a–58d of the respective liners 54a–54d engaging the exterior side surface 60 of the cap 56. The housing 12 then rotates, thereby threadably attaching the cap 56 to a container 76. When the compressed air is vented, the piston 72 is retracted by the spring 78 and the body 18 expands moving the cap gripping portions 52a–52d from a closed position to an open position so that a new container cap 56 may be received therein for threadably tightening it to another container 76.

While the foregoing has described a particularly preferred embodiment of the apparatus of this invention, numerous other variations and modifications, all within the scope of the invention, will readily occur to those skilled in the art. Accordingly, the descriptions are to be considered only as illustrative of the principals of the invention and not to be limitative thereof. The scope of this invention is to be defined solely by the claims appended thereto.

What is claimed is:

1. A collet for gripping the exterior surface of generally cylindrical threaded caps for rotation of the caps onto threaded open ends of containers, comprising:

a plug having a first end surface, a second end surface and at least one side extending therebetween;

a plurality of rigid segments, each segment of said plurality of segments having a first end, a second end, a first side and a second side, said second side proximal said second end being sized and configured to engage a portion of the exterior side of a threaded cap, said plurality of segments being mounted in series about said at least one side of said plug such that said second side of each said segment pivotally engages said plug for movement of said second end of each said segment between an open position, defined as when said second end of each segment is spaced apart from a cap that is receivable between said plurality of segments, and a closed position, defined as when said second end of each said segment engages a cap when inserted between said plurality of segments;

a means for biasing said segments from said closed position to said open position; and a band extending about said segments of said collet said band engaging said second side of each said segment such that each said segment is held in engagement with said plug.

2. A collet as in claim 1 further comprising:

a ridge circumferentially extending about at least a portion of said side of said plug;

a groove formed in said second side of each segment proximal said first end of each said segment, each said groove receiving a portion of said ridge therein, whereby said second end of each segment is pivotable about said ridge.

3. A collet as in claim 1 further comprising a plurality of vanes extending outwardly from said plug, one said segment being received between each pair of adjacent vanes of said plurality of vanes.

4. A collet as in claim 1 wherein said means for biasing said segments comprises an elastic body formed from an elastomer.

5. A collet as in claim 4 wherein at least one segment further comprises a shoulder formed in said second side thereof such that said body engages said shoulder and is held thereby between said segments of said collet.

6. A collet as in claim 4 wherein said body engages a portion of said second side of each segment of said plurality of segments.

7. A collet as in claim 1 wherein at least one segment further comprises a recess formed in said first side thereof proximal said first end of said segment, said recess being sized and configured to receive a portion of said band therein.

\* \* \* \* \*